United States Patent [19]

Hauberg

[11] 4,076,507
[45] Feb. 28, 1978

[54] CENTRIFUGAL SEPARATOR FOR SEPARATING LIQUID AND GAS

[75] Inventor: Georg Hans Henrik Hauberg, Allerod, Denmark

[73] Assignee: Aktieselskabet Niro Atomizer, Soborg, Denmark

[21] Appl. No.: 696,917

[22] Filed: Jun. 17, 1976

[30] Foreign Application Priority Data

Jun. 18, 1975 Denmark .............................. 2757/75

[51] Int. Cl.² ............................................ B01D 45/12
[52] U.S. Cl. .......................................... 55/1; 55/218; 55/257 C; 55/459 R
[58] Field of Search .................... 55/235–238, 55/204, 205, 257 C, 218, 219, 459, 394, 423, 454, 169; 210/512; 209/211

[56] References Cited

U.S. PATENT DOCUMENTS

| 445,472 | 1/1891 | Manning | 55/219 |
|---|---|---|---|
| 2,487,176 | 11/1949 | Pitt et al. | 55/238 |
| 2,604,185 | 7/1952 | Johnstone et al. | 55/237 |
| 2,846,024 | 8/1958 | Bremi | 55/454 |
| 3,163,508 | 12/1964 | Tuck et al. | 55/204 |
| 3,546,851 | 12/1970 | Hardison et al. | 55/238 |
| 3,771,289 | 11/1973 | Skoli et al. | 55/238 |

FOREIGN PATENT DOCUMENTS

| 285,849 | 8/1971 | U.S.S.R. | 209/211 |

Primary Examiner—Bernard Nozick
Attorney, Agent, or Firm—Dennison, Dennison, Meserole & Pollack

[57] ABSTRACT

A centrifugal separator for separating liquid and gas comprising a container having a cylindrical wall with a vertical axis and bottom wall defining a central inner surface part having a domed or convex shape, and an annular channel defined at the lower part of the cylindrical wall. The mixture of liquid and gas is introduced into the container and caused to rotate about the said vertical axis. Gas is discharged from the container through a gas discharge tube arranged centrally in the upper part of the container, and liquid is discharged from the annular channel through one or more liquid discharge conduits being connected to a level control device for securing a liquid level within predetermined limits in the channel or groove.

12 Claims, 3 Drawing Figures

CENTRIFUGAL SEPARATOR FOR SEPARATING LIQUID AND GAS

BACKGROUND OF THE INVENTION

1. Field of the Invention.

The present invention relates to a centrifugal separator for separating liquid and gas from a mixture or suspension of liquid and gas being fed into the separator.

Such separators may comprise a container having a circumferential wall shaped substantially as a surface of revolution with a substantially vertical axis. When a mixture of gas and liquid is introduced in the container and caused to rotate about said vertical axis, liquid and gas are separated under the influence of centrifugal forces so that gas may be discharged from the central part of the container through a discharge tube arranged at the upper end of the container, and liquid may be discharged at the lower end of the container adjacent to its circumferential wall.

However, in cases where the liquid in the liquid-gas mixture is inclined to foam, problems arise in connection with the known centrifugal separators. Thus, the central gas whirl in the separator influences the liquid in the separator so that foam is created, and this foam tends to be sucked into the gas whirl and discharged from the separator together with the gas phase so that the gas phase discharged will contain liquid particles. The remaining part of the foam created is discharged together with the liquid phase so that the liquid discharged from the separator contains gas and this may under certain circumstances give rise to problems.

Such mixture of gas and a liquid inclined to foam may, of course, have been created in any of widely differing manners or may originate from widely differing processes. There may also be several different reasons why it is desired to separate the mixture into its single phases. However, as an illustrative example it may be mentioned that the drying gas discharged from a spray drying system for producing milk powder or whey powder quite often has to be freed from its content of entrained dried powder. This may be done by injecting a liquid — for example the milk or whey which is subsequently to be dried in the spray dryer — into the discharge gas whereafter the mixture of discharge gas and liquid is passed to the centrifugal separator from which the separated, purified gas may be discharged into the atmosphere whereas the liquid separated therefrom and enriched with the powder washed out from the discharge gas may be passed further on to an evaporator. By introducing the liquid subsequently to be dried in the spray dryer into the drying gas discharged therefrom, a heat economical advantage may be obtained. This is especially true when the drying gas discharged from the spray dryer has a relatively great drying potential which is the case for example in spray drying of whey. When skimmed milk is being dried the drying potential of the discharge gas is somewhat smaller.

When known centrifugal separators of the above type are used for purposes as that mentioned above as an example, the creation of foam and the sucking of this foam into the central gas whirl are especially disadvantageous because it may cause that conditions for bacterial growth are provided in certain parts of the separator. Furthermore, a substantial content of gas bubbles in the liquid discharged from the separator may give rise to problems when the liquid is passed to an evaporator as mentioned above.

2. Description of the Prior Art.

German "Auslegeschrift" No. 1,168,868 discloses a cyclone having an outer wall part formed as a downwardly narrowing truncated cone in the lower end of which a cross-sectional constriction is defined, for example by a liquid discharge tube extending upwardly in the lower part of the cyclone, or by a disc-shaped insert mounted on a vertical stem or shank. In the said patent specification it is maintained that a cyclone of this type is able to defoam foaming sulphite lye to a substantial extent. In the patent specification it is admitted, however, that it may be difficult to obtain a complete separation of the liquid and gas phases, and that part of the separated liquid tends to move into the central gas whirl where the liquid is converted into foam which is mainly removed together with the gas phase. Furthermore, the said known separator is not suitable for treating food products, such as milk products, because in that case a fairly sharp separation between the dry and wet inner surface parts of the apparatus is necessary, and the residence time in the separator must also be relatively short for all parts of the liquid or foamed product so that no possibilities for heavy bacterial growth are created. The last mentioned condition is not fulfilled by the above mentioned known cyclone because its lower part has such a complicated shape that portions of the liquid or wet product may obtain a rather long residence time in certain areas of the separator.

U.S. Pat. No. 3,731,467 discloses a centrifugal separator of the previously mentioned type having a circumferential, cylindrical wall, and liquid discharge means which include level control means for securing a predetermined minimum liquid level at the lower part of the circumferential container wall. The end walls of this known separator container have the usual dished or domed shape in order to increase their strength. The liquid discharge tube of the known separator is connected to the separator container at a position spaced above the upper part of the domed bottom wall of the container. Consequently, during operation the separator container contains a relatively great amount of rotating liquid which totally covers the container bottom because the liquid level must necessarily be higher than the position at which the liquid discharge tube opens into the container. That means that the central core of the gas whirl formed in the separator will be immediately adjacent to the liquid supported by the container bottom, and thus liquid particles will tend to be sucked up into the whirl core. If the liquid is liable to foam the gas discharged from the container through the gas discharge tube will contain a substantial amount of foam.

SUMMARY OF THE INVENTION

The present invention provides a centrifugal separator of the above type in which it is possible to obtain an effective separation of the phases of a mixture of liquid and gas even when the liquid is liable to foam, and which is suitable for treating products for which it is important that conditions allowing heavy bacterial growth are avoided.

The centrifugal separator according to the invention comprises (a) a container having a circumferential wall shaped substantially as a surface of revolution with a substantially verticl axis and a bottom wall defining a central inner surface part having a domed or convex shape, an annular channel or groove being defined between said central part of the bottom wall and the lower part of the circumferential wall of the container, (b) means for introducing a mixture of gas and liquid into the container and for causing said mixture to rotate about said vertical axis, (c) a gas discharge means extending centrally into the upper end of the container and terminating at a position spaced substantially from said central surface part of the container bottom, and (d) means communicating with said channel or groove for discharging liquid from the container and comprising level control means for securing a predetermined minimum liquid level in the container adjacent to its circumferential wall.

During operation of the separator according to the invention said annular channel or groove receives the lower part of the liquid layer rotating along the circumferential wall of the container, and thereby it may be prevented that under the influence of gravity this liquid layer spreads too far inwardly towards the longitudinal axis of the separator and of the gas whirl. The introduction of liquid phase into the gas whirl is also counteracted by the domed or convex shape of the central inner surface part of the bottom wall, i.a. because the convex bottom causes that the lower end of the central gas whirl will be positioned spaced above the thicker lower part of the rotating liquid layer. Thus, the said annular channel or groove causes a relatively sharp limit between the lower part of the rotating liquid level and the central gas whirl, provided that the amount of liquid supplied to the separator container is related to the rate of discharging liquid from the annular channel or groove so as to maintain a suitably small amount of liquid in the container. Thereby the whipping up or whirling up of liquid into the gas whirl which tends to take place in the known separators may be avoided, and consequently discharge of foam together with the gas phase may also be avoided. Owing to the level control means which secure maintaining of a certain minimum amount of liquid within the annular channel or groove, the gas is also prevented from being discharged from the separator container together with the liquid. Thus, by means of the centrifugal separator according to the invention it is possible to obtain a separation of liquid and gas phase which is substantially more complete than that obtainable by means of the known centrifugal separators of the type in question, and this is especiallly true when the liquid in question tends to foam.

The term "domed or convex shaped" as used in this specification is intended to comprise any protruding shape whether its contour is smoothly curved or angular. Thus, for example, the central inner surface part of the container bottom wall may have the form of an obtuse angled conical surface.

A more distinct limit between the lower part of the liquid layer rotating in contact with the circumferential wall of the separator container, and the central gas whirl may be obtained when the inner circumferential wall of the annular channel or groove is substantially vertical or sloping upwardly and radially outwardly. In principle, the said level control means may be of any type provided that they are able to prevent that all or substantially all liquid is drained from the annular channel or groove in the separator container. As an example, the level control means may comprise a liquid trap having an upper bend positioned at a level above the bottom of the annular channel or groove. Alternatively, the level control means may comprise a level controlling container or vessel communicating with one or more liquid discharge conduits, an overflow passage for conducting liquid from the level controlling vessel and opening into said vessel at a level securing said predetermined minimum liquid level in the annular channel of the separator container. Such an arrangement has the advantage that the level control vessel may have a capacity sufficient to serve as a buffer container which means that the level control vessel may supply liquid to the annular channel in order to substantially maintain the desired minimum liquid level therein if for some reason or another too much liquid has been removed from the container. It should be understood that the level chosen for the opening of the overflow passage in the level controlling vessel will depend on a possible pressure difference between the separator container and the level controllling vessel.

Preferably, the level control device also comprises means for securing a predetermined maximum liquid level in the channel or groove so as to prevent that the central inner surface part of the bottom wall is permanently covered by liquid during operation.

It is important that the central inner surface part of the bottom wall has a suitable arching or convexity. If this central surface part is relatively flat the risk that an excessive amount of the rotating liquid spreads too far inwardly towards the central core of the gas whirl and is sucked up into the same is increased, and if the arching or convexity of the said central surface part is too pronounced it cannot serve as a suitable supporting surface for the gas whirl which will then tend to spread radially outwardly towards the annular channel. In case the central inner surface part of the bottom wall defines a conical surface part it may preferably have a top angle of 130° – 170° and preferably 150° – 160°. However, as mentioned above the central inner surface part of the container bottom wall need not necessarily define a conical surface, but may have any other convex or domed shape defining surfaces with a similar slope.

Out of consideration for a good function of the centrifugal separator according to the invention it is important that the distance between the gas discharge tube and the central inner surface part of the container bottom wall is not too small in order to make room for the gas whirl. According to the invention the distance between the lower end of the gas discharge tube and the upper end of the central part of the container bottom wall may be 0.35 – 0.75, and preferably about 0.55 of the inner diameter of the circumferential container wall.

BRIEF DESCRIPTION OF THE DRAWING

The invention will now be further described with reference to the drawings, wherein FIG. 1 diagrammatically shows a side view and partially sectional view of a system including an embodiment of the centrifugal separator according to the invention, FIG. 2 diagrammatically shows a plan view of the centrifugal separator.

DESCRIPTION OF THE PREFERRED EMBODIMENT

Figure 1:
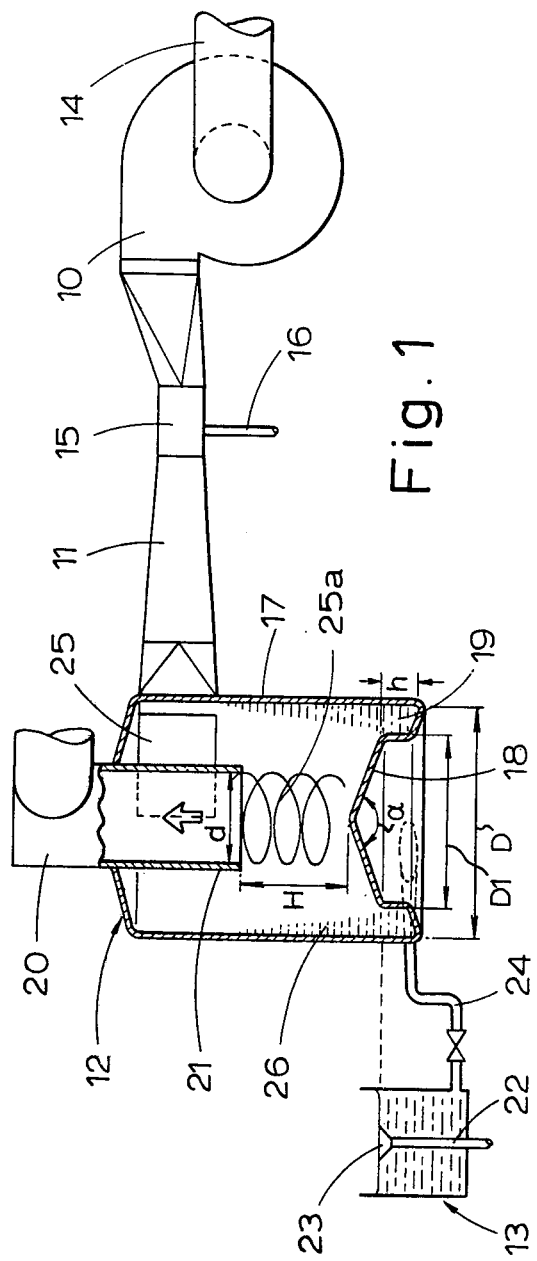

FIG. 1 illustrates a gas scrubber system comprising a blower or fan 10, a Venturi tube 11, a centrifugal separator 12, and a liquid level control device 13.

Through an intake tube 14 the blower 10 takes in gas which is to be washed or purified in the scrubber and blows the gas through the Venturi tube 11 towards the centrifugal separator 12. In the throat 15 of the Venturi tube a suitable amount of liquid is continuously introduced into the gas through a liquid supply conduit 16 whereby a gas-liquid mixture in the form of gas with suspended, uniformly distributed liquid droplets is provided within the Venturi tube 11.

The centrifugal separator 12 comprises a separator container having a circumferential cylindrical wall 17, and a bottom having a upwardly extending, arched central part 18 the inner surface of which has a domed or convex shape. An upwardly open channel or groove 19 is defined between the inner surface of the circumferential wall 17 and the inner surface of said central part of the container bottom. A gas discharge tube 20 positioned above the separator container extends centrally into the upper part of the container as a tube section 21.

The liquid level control device 13 secures a certain minimum liquid level in the channel 19, and in the embodiment shown it comprises a liquid container or vessel in which an overflow tube or discharge tube 22 opening into a funnel 23 at its upper end, is arranged. The level controlling vessel is communicating with the annular channel 19 through a connecting conduit 24, and therefore the minimum liquid level in the annular channel will be the same as the level defined by the free edge of the funnel 23 provided that the pressure in the separator container and the pressure in the liquid vessel are identical.

Alternatively, the container or vessel may be provided with a discharge conduit (not shown) controlled by a float valve or the like for determining a minimum liquid level in said vessel and thus also in the channel 19. In that case the overflow tube 22 may be used for determining a maximum liquid level in the vessel and in the channel 19.

The Venturi tube 11 opens into the upper part of the separator container at an inlet opening 25 and extends substantially tangentially in relation to the cylindrical wall 17. In the embodiment shown the lower end of the opening 25 is spaced above the lower free edge of the tube section 21, and when the blower blows liquid-gas mixture into the separator containing through the inlet opening 25 a rotating or whirling movement will be imparted to that mixture whereby under the influence of centrifugal forces the liquid particles will collect as a rotating liquid layer 26 along the inner surface of the circumferential wall 17, whereas the gas forms a central gas whirl 25a in the separator container. Separated gas phase may continuously be discharged through the gas discharge tube 20 and liquid phase may continuously be discharged from the channel 19 through the connecting conduit 24, the level controlling vessel, and the overflow tube 22. The connecting conduit 24 preferably opens into the channel 19 in a tangential direction because the rotation of the liquid in the separator container will then promote discharge of liquid through the conduit 24. Furthermore, the opening through which the connecting conduit 24 communicates with the channel 19 may be relatively large, the cross-section of the conduit 24 may then decrease in a downstream direction. For example, the conduit may have a conical shape or comprise a conical section. That measure is believed to counteract discharge of foam together with the liquid from the channel or groove.

As the lower part of the liquid layer 26 is received in the annular channel or groove 19, the liquid will not tend to be sucked into the gas whirl 25a under normal operational conditions. Such sucking of liquid into the gas whirl is also counteracted by the upwardly arched central part of the separator bottom wall. Consequently, no substantial foam problems arise in connection with the scrubber system described even when the liquid used is liable to foam. The level control device 13 prevents that the liquid level in the channel 19 falls to such an extent that the inlet opening of the connecting conduit 24 is exposed to gas phase, and thus it is prevented that gas bubbles are introduced in the liquid phase being discharged. Such gas bubbles could, as explained below, give rise to problems, for example when the discharged liquid is passed to an evaporator (not shown).

Figure 3:
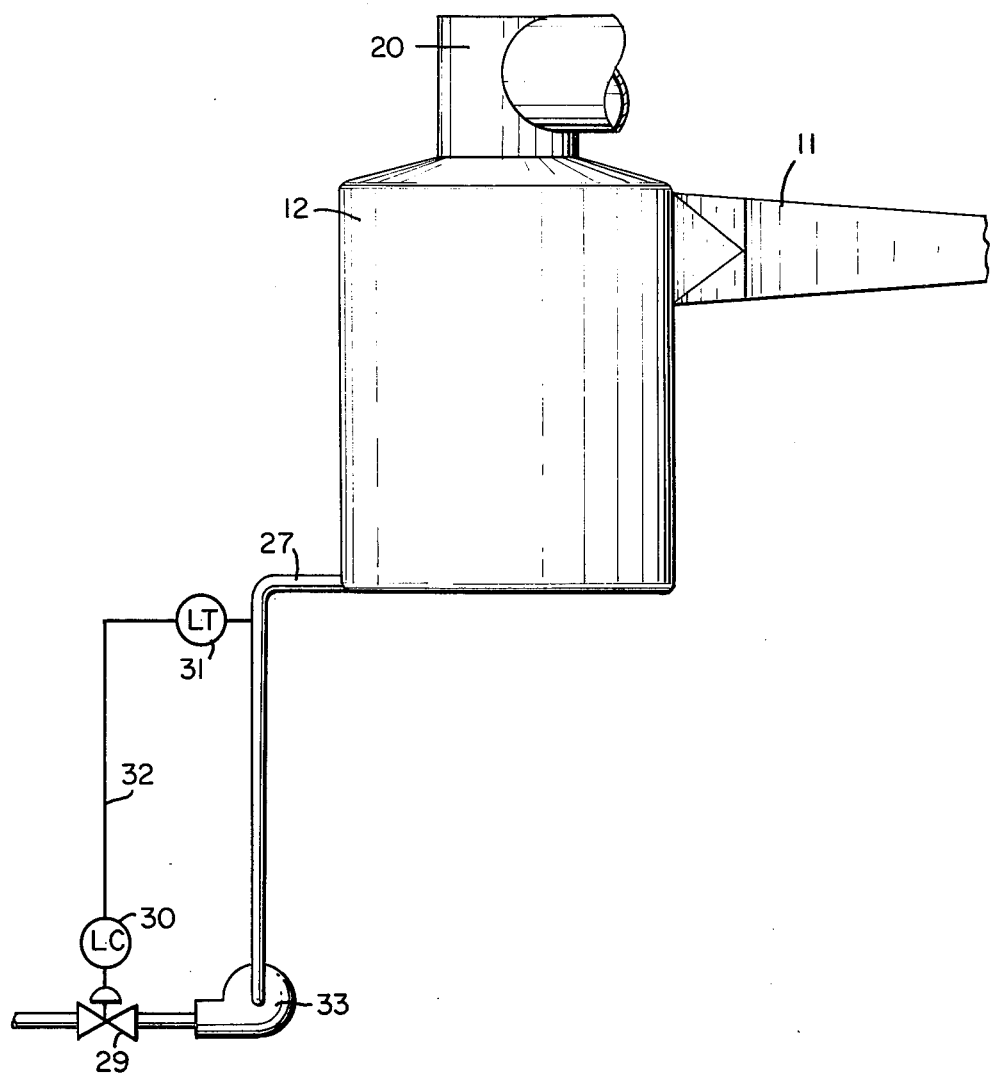
FIG. 3 shows diagrammatically an alternative embodiment of the system shown in FIG. 1.

FIG. 3 illustrates a modified embodiment where the level control device shown in FIG. 1 has been replaced by an arrangement by means of which the liquid level in the channel 19 may automatically be kept within predetermined maximum and minimum limits. A discharge conduit 27 communicating with the channel 19 in the separator 12 contains a discharge pump 33. A pressure sensor or level transmitter LT indicated by 31 is connected to the conduit 27 at the upstream side of the pump 33.

Signals representative of the liquid level in the channel or groove 19 are generated by the sensor 31 and transmitted through a line 32 to a pressure control or level control LC indicated by 30. The pressure or level control 30 controls a motor operated valve 29 mounted in the conduit 27 downstream of the pump 33 so as to maintain the liquid level in the channel or groove 19 within predetermined maximum and minimum levels. The minimum levels is preferably chosen so as to prevent gas phase from being discharged through the conduit 27, and the maximum level is preferably such that during operation the inner central surface part of the separator bottom will only from time to time be wetted by a thin liquid film removing solid material deposited thereon.

The systems shown on the drawings are able to meet the requirements made of a so-called sanitary scrubber, which means that the system may i.a. be used for treating liquid food products, such as milk and milk products. Examples of such use are stated below:

EXAMPLE 1

Figure 2:
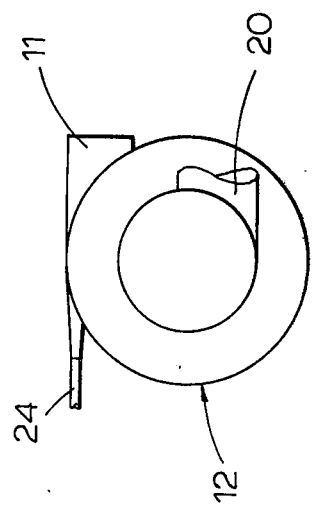

A scrubber system of the type shown in FIGS. 1 and 2 of the drawings was used in connection with a plant or system for making skimmed milk powder by concentrating and spray drying.

The cylindrical wall 17 of the separator container had a diameter of 2800 mm and a height of 3100 mm, and the diameter of the central tube section 21 was 1250 mm. The central part 18 of the bottom of the separator container had a conical shape with a top angle of 150°, and the annular channel 19 had a radial width of 250 mm and a maximum depth of 200 mm at the cylindrical wall 17.

Discharge air from the spray drying system was supplied to the intake tube 14 of the blower 10 in an amount of 41,500 kg/hour at a temperature of 90° C, and the air supplied contained 175 mg/$Nm^3$ milk powder.

10,000 liters/hour skimmed milk having a content of 8.7 percent dry matter and a temperature of 8° C were supplied to the Venturi throat 15 through the liquid supply conduit 16, and 9,875 liters/hour concentrated skimmed milk were discharged from the centrifugal separator 12 through the conduit 24 at a temperature of 44.5° C. Thus, 125 liters/hour were evaporated in the separator.

Air was discharged from the separator through the gas discharge tube 20 at a temperature of 55.0° C and with a content of 28 mg/Nm³ milk powder.

The scrubber system was in continuous operation for 22 hours and in that period samples for microbiological analyses were taken out every hour. The analyses showed that no appreciable increase in bacterial count took place when the milk passed through the centrifugal separator so that despite the use of a scrubber system it was still possible to fulfil the requirements regarding the quality of milk powder as stated in for example the standard issued by ADMI (American Dry Milk Institute Inc.).

After the operation period of 22 hours the inner surface of the tube section 21 was covered by only a thin layer of light, dry powder deposits.

EXAMPLE 2

A scrubber system of the type shown in FIGS. 1 and 2 of the drawings was used in connection with a plant or system for producing whey powder by concentrating and spray drying. The cylindrical wall 17 of the separator container had a diameter of 2360 mm and a height of 2700 mm, and the diameter of the tube section 21 was 1070 mm. The central part 18 of the bottom wall of the separator container was shaped as a cone having a top angle of 160°, and the surrounding annular channel 19 had a radial width of 250 mm and a maximum depth of 200 mm at the cylindrical wall 17.

Discharge air from the spray drying system was supplied to the blower 10 through the intake tube 14 at an amount of 30,000 kg/hour and at a temperature of 73° C. The air container 250 mg/Nm³ whey powder.

Whey in an amount of 10,500 liters/hour and with 5.75 percent content of dry matter was supplied to the Venturi throat 15 through the liquid supply conduit 16 at a temperature of 8° C. Liquid in an amount of 10,075 liters/hour was discharged from the separator through the connecting conduit 24 at a temperature of 35° C. Consequently, the amount of liquid evaporated in the separator amounted to 425 liters/hour.

Air at a temperature of 37° C and containing 20 mg/Nm³ whey powder was discharged from the separator through the gas discharge tube 20.

The scrubber system was in continuous use for 22 hours, and after that period of operation the inner surface of the tube section 21 was covered by only a thin layer of light, dry powder deposits.

The below table states preferred maximum, normal, and minimum values of various dimensions in relation to the inner diameter D of the circumferential container wall 17 (see FIG. 1):

|     | Minimum value | Normal value | Maximum value |
| --- | --- | --- | --- |
| d   | 0.4 × D | 0.45 × D | 0.6 × D |
| H   | 0.35 × D | 0.55 × D | 0.75 × D |
| D1  | d | 0.8 × D | D − 200 mm |
| h   | 100 mm | 0.1 × D | D − D1 |
| α   | 130° | 150° | 170° | wherein $d$ is the inner diameter of the tube section 21,

H is the distance between the lower end of the tube section 21 and the upper area of the central part 18 of the container bottom, D1 is the outer diameter of the inner side wall of the groove or channel 19, h is the maximum depth of the channel 19, and α is the top angle of the cone shaped central part 18.

It should be understood that various amendments of the embodiment shown on the drawings could be made within the scope of the present invention. As an example the outer side wall of the annular channel 19 need not be a direct continuation of the cylindrical wall 17, but may form an annular bulging thereon. Furthermore, it should be mentioned that the liquid level control device 13 shown on the drawing may be replaced by any other suitable liquid level control device, such as a liquid trap.

I claim:

1. A centrifugal separator for separating liquid from a gas and comprising
   a. a container having a circumferential cylindrical wall shaped substantially as a surface of revolution with a substantially vertical axis and a bottom wall defining a central inner surface part having an upwardly domed shape spaced from the side wall, an annular channel being defined between said central surface part of the bottom wall and the lower part of the circumferential wall of the container
   b. means for introducing a mixture of gas and liquid into the container and for causing said mixture to rotate about said vertical axis,
   c. a gas discharge tube extending centrally into the upper end of the container and having an unobstructed end opening terminating at a position spaced substantially from said central surface part of the container bottom, and
   d. outlet means communicating with said channel for discharging liquid from the container and level control means for securing a predetermined minimum liquid level in the channel of the container at least above the liquid discharge outlet means and a maximum liquid level in the channel whereby the upper surface portion of said domed central inner surface is only wetted by a thin liquid film.

2. Centrifugal separator according to claim 1, wherein the annular channel includes an inner circumferential wall that slopes upwardly and radially outwardly.

3. A centrifugal separator according to claim 1, wherein said level control means are adapted also to secure a predetermined maximum liquid level in the annular channel.

4. A centrifugal separator according to claim 1, wherein the inner circumferential wall of the annular channel is substantially vertical.

5. A centrifugal separator according to claim 1, wherein said level control means comprise a level controlling container communicating with at least one liquid discharge conduit, an overflow passage for conducting liquid from the level controlling vessel and opening into said vessel at a level securing said predetermined minimum liquid level in the annular channel of the separator container.

6. A centrifugal separator according to claim 1, wherein the domed central surface part of the container bottom wall has the form of an obtuse angled conical surface.

7. A centrifugal separator according to claim 6, wherein the top angle of said conical surface is 130°–170° and preferably 150°–160°.

8. A centrifugal separator according to claim 1, wherein said liquid discharge means comprises at least one liquid discharge tube extending substantially tangentially outwardly from the said annular channel in the direction of rotation of said mixture of gas and liquid.

9. A centrifugal separator according to claim 8, wherein said at least one liquid discharge tube extending from the annular channel has a decreasing cross-sectional area.

10. A centrifugal separator according to claim 1, wherein said gas discharge means is a gas discharge tube open at its lower end.

11. A centrifugal separator according to claim 10, wherein the distance between the lower end of the gas discharge tube and the upper end of the central part of the container bottom wall is 0.35 – 0.75, and preferably about 0.55 of the inner diameter of the circumferential container wall.

12. A method of separating suspended liquid droplets from a gas flow in a container having a circumferential cylindrical wall shaped substantially as a surface of revolution with a substantially vertical axis and a bottom wall defining a central inner surface part having an upwardly domed shape spaced from the side wall, an annular channel being defined between said central surface part of the bottom wall and the lower part of the circumferential wall of the container, said method comprising a. introducing said gas flow with suspended liquid droplets into the container and causing said gas to rotate about said vertical axis, b. discharging gas phase from the container at a position adjacent to said vertical axis and spaced substantially from said central surface part of the container bottom, c. discharging liquid phase from said channel through at least one liquid discharge opening communicating therewith, and d. maintaining the liquid level in said channel between predetermined limits preventing said liquid discharge opening from being exposed to gas phase and preventing said central surface part of the container bottom wall from being covered by a liquid layer of any substantial thickness.

* * * * *